(12) United States Patent  
Tanaka et al.

(10) Patent No.: US 7,375,774 B2
(45) Date of Patent: May 20, 2008

(54) METHOD OF MANUFACTURING SEMICONDUCTOR DEVICE

(75) Inventors: Hideki Tanaka, Chino (JP); Ichio Yudasaka, Chino (JP); Masami Miyasaka, Shinosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 280 days.

(21) Appl. No.: 11/032,135

(22) Filed: Jan. 11, 2005

(65) Prior Publication Data

US 2005/0157222 A1 Jul. 21, 2005

(30) Foreign Application Priority Data

Jan. 20, 2004 (JP) .............................. 2004-011816

(51) Int. Cl.
*G02F 1/136* (2006.01)
(52) U.S. Cl. .............................. 349/47; 349/42; 349/43
(58) Field of Classification Search .................. 349/42, 349/43, 47; 257/59, 72
See application file for complete search history.

(56) References Cited

U.S. PATENT DOCUMENTS

| 5,132,248 | A |   | 7/1992 | Drummond et al. |
| 5,989,945 | A |   | 11/1999 | Yudasaka et al. |
| 6,466,279 | B1 |   | 10/2002 | Nakata |
| 6,514,801 | B1 |   | 2/2003 | Yudasaka et al. |
| 6,665,032 | B1 | * | 12/2003 | Kikkawa ..................... 349/117 |
| 6,856,360 | B1 | * | 2/2005 | Higuchi et al. ................ 349/43 |
| 2002/0074547 | A1 | * | 6/2002 | Yudasaka et al. .............. 257/57 |
| 2002/0158995 | A1 | * | 10/2002 | Hwang et al. ................. 349/43 |
| 2003/0234398 | A1 | * | 12/2003 | Aoki et al. ..................... 257/72 |
| 2004/0041240 | A1 | * | 3/2004 | Farnworth et al. ........... 257/643 |

FOREIGN PATENT DOCUMENTS

| JP | A-10-194719 | 7/1998 |
| JP | A-11-307778 | 11/1999 |
| JP | A-2000-58646 | 2/2000 |
| WO | WO 00/59040 | 10/2000 |
| WO | WO 00/59040 A1 | 10/2000 |

* cited by examiner

*Primary Examiner*—Michael H. Caley
(74) *Attorney, Agent, or Firm*—Oliff & Berridge PLC

(57) ABSTRACT

A simple method of manufacturing a semiconductor device including a thick and dense insulator layer having a uniform film thickness includes forming the insulator layer by repeatedly applying a liquid material to a conductive layer plural times.

14 Claims, 4 Drawing Sheets

METHOD OF MANUFACTURING SEMICONDUCTOR DEVICE

BACKGROUND

Exemplary embodiments relate to a method of manufacturing a semiconductor device.

In the related art, in electronic devices such as semiconductor devices, the utilization of multi-layer interconnections is used in order to achieve high integration. With respect to a semiconductor device having multi-layer interconnections, when electrically connecting upper and lower wiring patterns that are disposed with an interlayer insulator layer therebetween, contact holes are formed in the interlayer insulator layer. Through the contact holes, the upper and lower wiring patterns are connected.

In the related art, in a method of making a multi-layer interconnection, a film of a conductive material such as metal and polycrystalline silicon is formed on a substrate. By etching the film, a lower wiring layer is formed. Next, while an interlayer insulator layer is formed on the lower wiring layer, predetermined openings (contact holes) are formed in the interlayer insulator layer using a photolithography method. Further, a conductive material as a contact plug is applied onto the whole area of the interlayer insulator layer in a manner to fill the formed contact holes, and then patterning is performed by a photolithography method, thus a contact plug is made. Then, a film of a conductive material for wiring on the upper layer is formed in a manner to connect with the contact plug. Patterning this film by a photolithography method forms an upper wiring layer (for example, International Patent Publication No. WO 00/59040).

SUMMARY

In WO 00/59040, a liquid material is used to form an interlayer insulator layer. That is, applying a liquid material and then heat-drying it to form an insulator layer. With such a method of forming an insulator layer using a liquid material, however, an insulator layer having enough thickness to form contact holes cannot be formed. That is, trying to form an insulator layer with a large film thickness fails to obtain an insulator layer that is dense and has a uniform film thickness, which may result in damaging the reliability of semiconductor devices.

Exemplary embodiments address or solve the above-described and/or other problems, and provide a simple method of manufacturing a semiconductor device including a dense insulator layer with a large and uniform film thickness.

In exemplary embodiments, a method of manufacturing a semiconductor device having an insulator layer, includes forming the insulator layer by repeatedly applying a liquid material onto a layer plural times. Thus, repeatedly applying a liquid material plural times makes it possible to form an insulator layer with a large film thickness. Further, it becomes possible to form a dense insulator layer having a uniform film thickness because the insulator layer is formed not by the step of applying a liquid material one time but by the step of applying the liquid material to the layer plural times. As a result, the reliability of these semiconductor devices is very high.

A method of manufacturing a semiconductor device according to the exemplary embodiments includes forming a first conductive layer on a substrate, forming an insulator layer by repeatedly applying a liquid material onto the first conductive layer plural times, and forming a second conductive layer on the insulator layer. Such a manufacturing method makes it possible to electrically insulate a first conductive layer from a second conductive layer by means of an insulator layer. Further, the insulator layer can be formed as an inter-layer insulator layer of a thick film that is fine and has a uniform film thickness by repeatedly applying, and therefore the reliability of the insulator layer becomes very high.

In the above-described insulator layer formation, after a first liquid material is applied and then dried, a second liquid material that is the same as or different from the first liquid material may be applied onto the applied layer. Applying the second liquid material after drying the applied first liquid material in this manner allows a second insulator layer made of the second liquid material to be formed on a first insulator layer made of the first liquid material. As a result, a thick insulator layer including the first and second insulator layers can be obtained.

Also, in the above-described insulator layer formation, after a first liquid material is applied and then baked, a second liquid material that is the same as or different from the first liquid material may be applied onto the applied layer. Applying the second liquid material after the applied first liquid material is baked in this manner allows a second insulator layer made of the second liquid material to be formed on a first insulator layer made of the first liquid material. As a result, a thick insulator layer including the first and second insulator layers can be obtained.

In an exemplary embodiment, "dry" means removing solvent components in a liquid material, and may involve, for example, a predetermined heating. On the other hand, "bake" means oxidizing solute components in a liquid material, and may involve, for example, heating at a higher temperature than that in a drying step. Further, if a second liquid material is applied after a first liquid material is dried, a step of simultaneously baking the first and second applied layers may be performed.

In an exemplary embodiment, a polysilazane solution can be used as the liquid material in the above-described method for forming an insulator layer. Polysilazane has Si—N bonding and is soluble in a solvent. Also, polysilazane can be transformed into silica (insulator layer) having Si—O bonding by heat treatment. In applying a liquid material, the use of, for example, a spin coating may simplify the method.

DETAILED DESCRIPTION OF EMBODIMENTS

Figure 1:
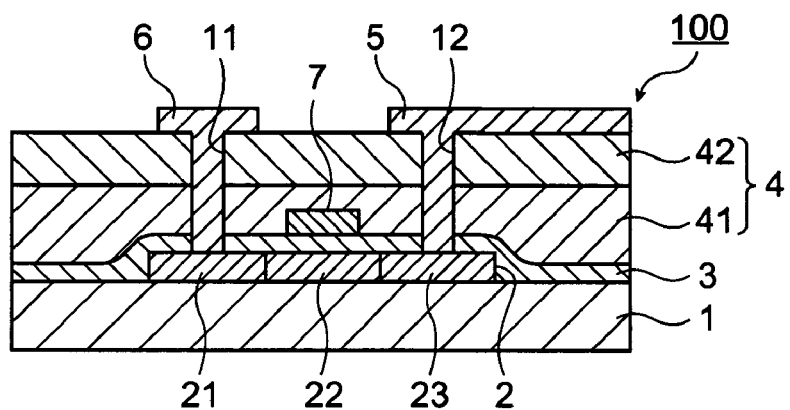
FIG. 1 is a sectional schematic showing an exemplary embodiment of a semiconductor device.

With respect to a method of manufacturing a semiconductor device, exemplary embodiments will be described in detail below using the drawings. FIG. 1 is a sectional schematic that shows the structure of a thin film transistor (TFT) 100, as an example of a semiconductor device manufactured by a manufacturing method of an exemplary embodiment, and FIGS. 2A to 4B are sectional schematics that show an outline of the processes with respect to a method of manufacturing the TFT 100. Incidentally, in each drawing, a scale is different for each layer or member in order to make each layer or member recognizable on the drawing.

Initially, in an exemplary embodiment, the structure of the TFT 100 to be manufactured will be described using FIG. 1. The TFT 100 shown in FIG. 1 includes a polysilicon film 2 on a surface of a glass substrate (base material) 1. The polysilicon film 2 may have a source region 21, a channel region 22, and a drain region 23. A source electrode 6 may be electrically connected to the source region 21 through a contact hole 11 formed in an interlayer insulator layer 4, while a drain electrode 5 may electrically be connected to the drain region 23 through a contact hole 12 formed in the interlayer insulator layer 4.

In an exemplary embodiment, the TFT 100 may be a pixel switching element of an electro-optic device, such as a liquid crystal device, and can be applied to a liquid crystal device, or the like, using the drain electrode 5 as a pixel electrode. Also, a gate electrode 7 may be formed above the channel region 22 of the polysilicon film 2, a gate insulation film 3 may be placed between the gate electrode and the channel region. The interlayer insulator layer 4 includes two insulator layers 41 and 42. Although each insulator layer may be made of a silicon oxide film made from polysilazane in the present exemplary embodiment, the insulator layer may be made of a different insulation material.

The gate electrode 7 may be deposited above the polysilicon film 2 with the gate insulation film 3 therebetween, while the source electrode 6 and the drain electrode 5 may be deposited above the polysilicon film 2 with the gate insulation film 3 and the inter-layer insulator layer 4 therebetween. As described above, the TFT 100 of the present exemplary embodiment may have a multi-layer interconnection structure and particularly may include the interlayer insulator layer 4 that is a thick film having a thickness of about 500 nm or more. This TFT 100 can be manufactured using a manufacturing method described below.

Figure 2A:
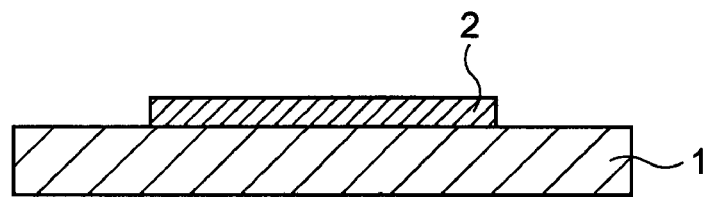
FIGS. 2A-2C are sectional schematics showing a process for a method of manufacturing the semiconductor device of FIG. 1 in an exemplary embodiment.

In an exemplary embodiment, with respect to a method of manufacturing the TFT 100 shown in FIG. 1, description will be given referring to FIGS. 2A to 4B. Initially, as shown in FIG. 2A, the polysilicon film 2 may be formed on a surface of the glass substrate 1. This polysilicon film 2 can be formed in the following manner. First, a lyophobic film (not shown), such as a fluorocarbon resin film, may be formed on the glass substrate 1. The element-forming region of this lyophobic film may then be irradiated with ultraviolet rays, or the like. The liquid repellent film in the element-forming region is decomposed and removed to obtain a pattern, thereby making a lyophobic bank. Subsequently, a liquid silicon hydride may be applied to the element-forming region and dried. Next, the dried silicon hydride film may be pyrolyzed by baking and is thereby turned into an amorphous silicon film. Further, after the entire glass substrate 1 is irradiated with ultraviolet rays to decompose and remove the lyophobic bank, the amorphous silicon film may be irradiated with excimer laser beams such as XeCl so as to be annealed. As a result, the amorphous silicon may be crystallized into the polysilicon film 2. Then, channel doping is performed for the polysilicon film 2. That is, appropriate impurities (for example, $PH_3$ ion in the case where a n-type conductive layer is formed) are implanted into the whole surface and diffused.

Figure 2B:
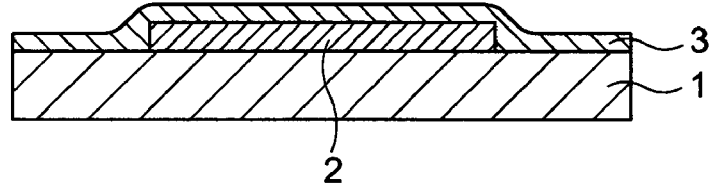

Next, as shown in FIG. 2B, the gate insulation film 3 may be formed so as to cover the polysilicon film 2. Specifically, a liquid material is applied to the entire glass substrate 1 and the applied liquid material is baked at a temperature of about 300 to 500 degrees Celsius, thereby obtaining the gate insulation film 3. Incidentally, solutions of polysilazane (for example, a xylene solution), polyimide, and a low-K material or the like can be used as the liquid materials. The liquid materials can be applied by using spin coating, dip coating, liquid source misted chemical deposition (LSMCD), slit coating, and a droplet discharging device or the like. Further, the liquid materials do not necessarily have insulation. It is sufficient that the ultimately obtained film has insulation. These liquid materials can be turned into an insulator layer generally by heat treatment after being dissolved in an organic solvent and applied. Therefore, it is desirable that solidifying of the liquid material be performed by heating the applied liquid material.

Figure 2C:
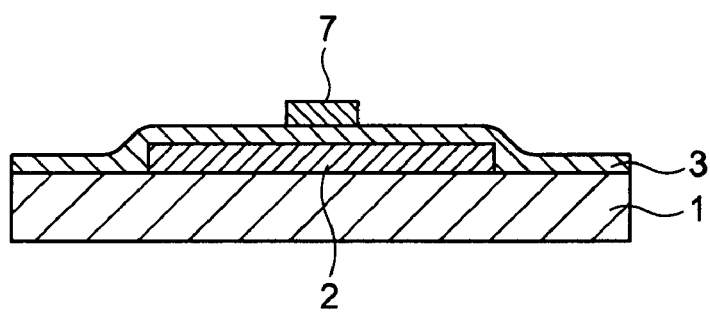

Then, as shown in FIG. 2C, the gate electrode 7 may be formed in a predetermined region on the gate insulation film 3. Specifically, a liquid conductive material having an organic metallic compound as a main component may be applied to the whole surface, and then patterning is performed by a photolithography method to selectively form the gate electrode in a predetermined region.

Figure 3A:
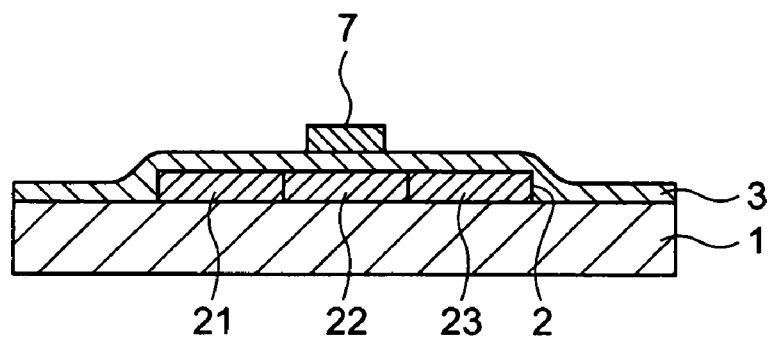
FIGS. 3A-3C are sectional schematics showing a process subsequent to the process of FIG. 2 in an exemplary embodiment.

Next, as shown in FIG. 3A, appropriate impurities (for example, $B_2H_6$ ion in the case of forming a p-type conductive layer) may be implanted into the polysilicon film 2 by using the formed gate electrode 7 as a mask. By this implantation of the impurity ions, the source region 21, the channel region 22, and the drain region 23 may be formed in the poly silicon film 2.

Figure 3B:
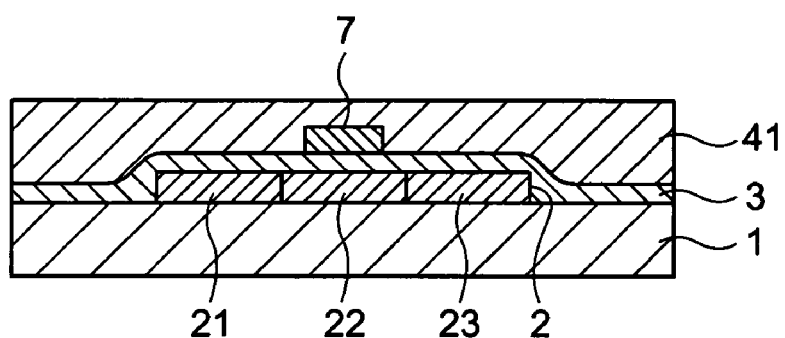

Also, as shown in FIG. 3B, the first insulation film 41 may be formed over the entire surface of the gate insulation film 3 (glass substrate 1) including the gate electrode 7. The first insulation film 41 may be formed by the same method as the above-described method for the gate insulation film 3, that is, by applying a liquid material composed of a xylene solution of polysilazane by spin coating and baking at a temperature of about 300 to 500 degrees Celsius.

Figure 3C:
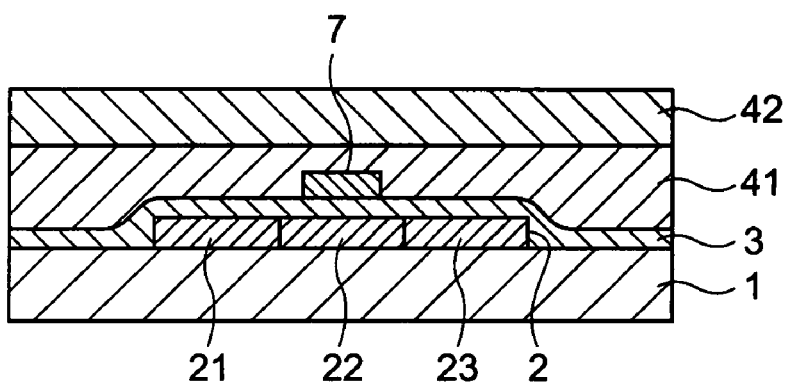

Further, as shown in FIG. 3C, the second insulation film 42 may be formed on the formed first insulation film 41. The second insulation film 42 may be formed by the same method as that for the first insulation film 41, that is, by applying a liquid material composed of a xylene solution of polysilazane by spin coating and baking at a temperature of about 300 to 500 degrees Celsius.

Figure 4A:
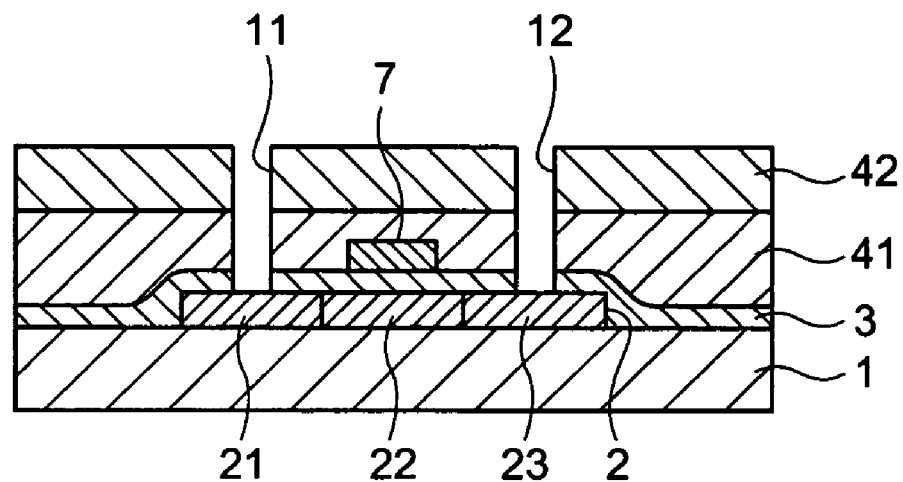
FIGS. 4A-4B are sectional schematics showing a process subsequent to the process of FIGS. 3A-3C in an exemplary embodiment.

Subsequently, as shown in FIG. 4A, the contact holes 11 and 12 may be formed in the first insulation film 41 and second insulation film 42. In this case, a mask (not shown) of a predetermined pattern may be formed on the second insulation film 42, and the contact holes may be formed by etching through the mask.

Figure 4B:
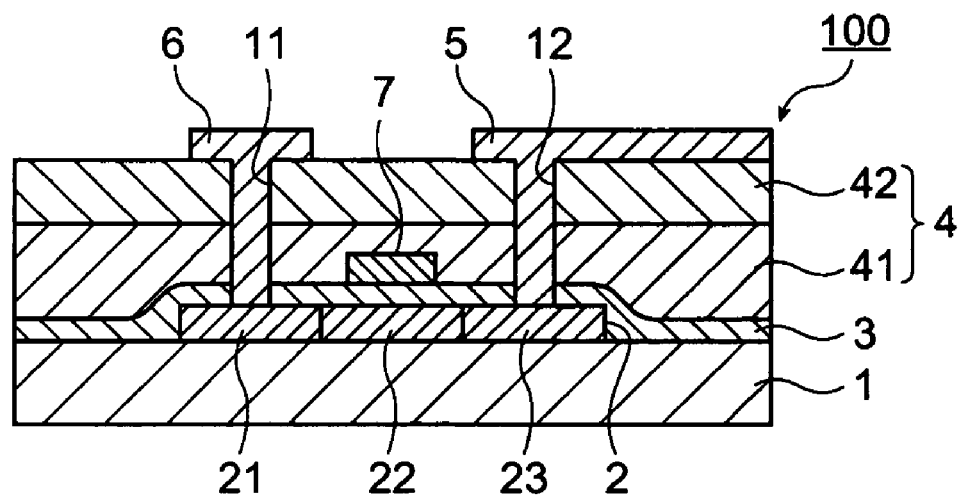

As shown in FIG. 4B, the formed contact holes 11 and 12 are provided selectively with a liquid contact-forming material having an organic metallic compound as a main component by using an ink-jet device (not shown), and then a contact plug may be formed by baking and solidifying the liquid contact-forming material. Further, in the manner of connecting to the contact plug, the source electrode 6 and the drain electrode 5 are formed in a predetermined wiring pattern. When forming patterns of the source electrode 6 and the drain electrode 5, an ink-jet device (not shown) can be used. Additionally, the contact plug, the source electrode 6 and the drain electrode 5 may be formed in the same step. That is, the electrodes 5 and 6 may be formed in parallel with filling the contact holes 11 and 12.

By the method of the exemplary embodiment described above, the TFT (semiconductor device) 100 shown in FIG. 1 can be obtained. In this method, a liquid material may repeatedly be applied to a layer in order to form the insulator layer 4 with a large film thickness. This makes it possible to form the dense insulator layer 4 having a uniform film thickness, and therefore the reliability of the TFT (semiconductor device) 100 manufactured becomes very high.

Although in the present exemplary embodiment, in order to form the insulator layer 4, after the first insulator layer 41 is formed by applying a first liquid material and then baking it, the second insulator layer 42 is formed by applying and baking a second liquid material, the second liquid material may be applied after applying the first liquid material and before baking it. In other words, after a first liquid material is applied and dried at a temperature of about 80 to 150 degrees Celsius, a second liquid material may be applied and then the first and second applied layers may be simultaneously baked at a temperature of about 300 to 500 degrees Celsius. In this case, the first liquid material need not be dried completely. The second liquid material may be applied in the state that the first liquid material is partially dried. Also, the drying and/or baking performed in the present exemplary embodiment may involve, for example, pressure reduction in addition to heating.

Also, although the first insulator layer 41 and the second insulator layer 42 may be made from the same material (polysilazane) in the present exemplary embodiment, the insulator layers may be composed of different materials. For example, the following constitution may be employed: the first insulator layer 41 may be made from polyimide, and the second insulator layer 42 may be made from polysilazane. Further, although the interlayer insulator layer 4 is made to be a thick film by repeatedly applying the liquid material twice in the present exemplary embodiment, repeatedly applying three, four or more times is permitted.

Next, the change of film thickness due to repeatedly applying the liquid material twice was examined in order to confirm the effects of the present exemplary embodiment. First, a xylene solution containing 20 wt % polysilazane was prepared and applied onto a 4 inch Si wafer by using a spincoater. Specifically, after dropping the solution in the atmosphere, the first coating was performed at various rotational speeds. The applied solution was pre-baked at about 100 degrees Celsius for 5 minutes. Further, annealing was performed in oxygen atmosphere at about 300 degrees Celsius for 1 hour. For the first insulator layer thus obtained, its film thickness was appraised with respect to each rotational speed.

Further, the second applying of liquid material onto the first insulator layer was performed in the same atmosphere, in the same manner, as the first application, at various rotational speeds. The applied solution was pre-baked at about 100 degrees Celsius for 5 minutes, and was further annealed in oxygen atmosphere at about 300 degrees Celsius for 1 hour. For the second insulator layer thus obtained, its film thickness was appraised with respect to each rotational speed. In this case, the value obtained by subtracting the film thickness of the first insulator layer from that of the multilayered insulator layer (first insulator layer+second insulator layer) obtained was calculated as the film thickness of the second insulator layer. The result is shown in FIG. 5, where the film thickness is indicated as the average value of 5 points in a wafer surface.

Figure 5:
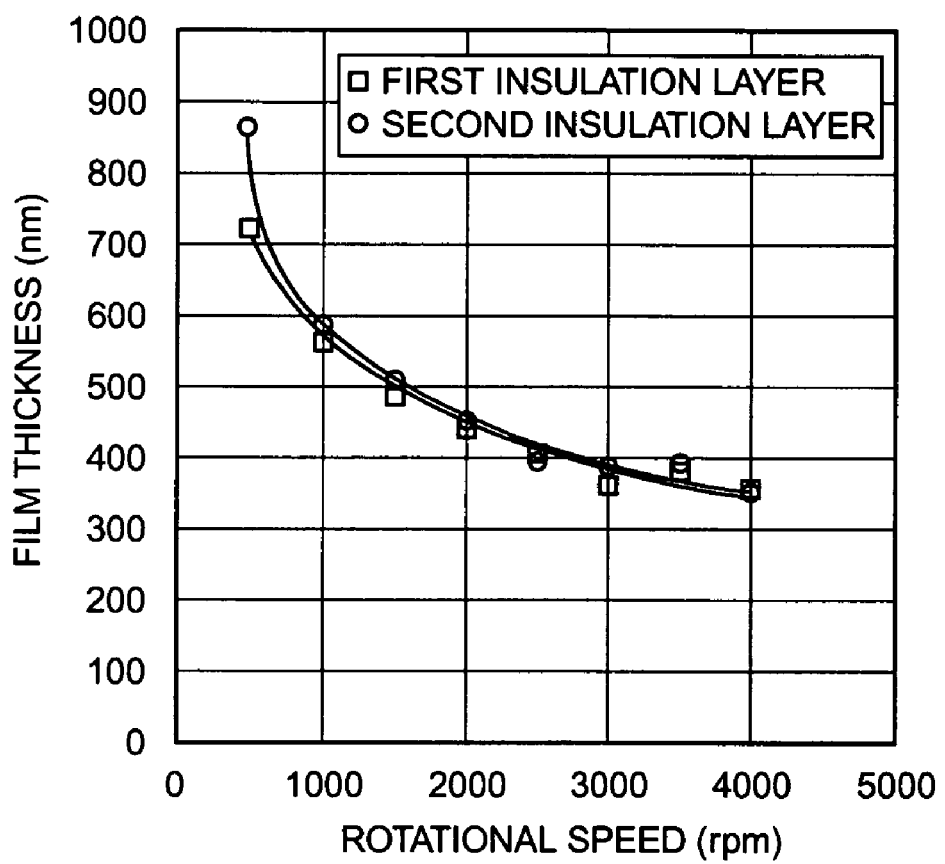
FIG. 5 is a graph showing the relationship of film thicknesses obtained by applying one time and by applying twice in an exemplary embodiment.

As shown in FIG. 5, in an exemplary embodiment, if rotational speed is the same, the film thickness of a first insulator layer formed by the first application of liquid material and that of a second insulator layer formed by the second application of liquid material are in close agreement. That is, it is shown that the film thickness is doubled by repeatedly applying the liquid material twice if rotational speed is the same. When rotational speed is about 1000 rpm or less, however, a wide in-plane variation in film thickness was observed.

Repeatedly applying liquid material in this manner enabled an insulator layer to be a thick film. Additionally, a dense insulator layer having a uniform film thickness was able to be formed compared with the case where a thick film was formed by a one time application. A semiconductor device with an insulator layer formed by repeatedly applying liquid material in this manner accomplishes insulation among conductive layers, and its reliability is very high.

What is claimed is:

1. A method of manufacturing a semiconductor device having a thin film transistor, comprising;

forming a thin film transistor on a substrate, the thin film transistor having a semiconductor layer, a first electrode, a second electrode, a gate electrode, and a gate insulator layer, the semiconductor layer being located between the first electrode and the second electrode, the gate electrode overlapping the semiconductor layer, and the gate insulator layer located between the semiconductor layer and the gate electrode;

applying a first liquid material including a first insulating material to form a first applied film over the gate electrode;

drying the first applied film at a temperature from 80 to 150 centigrade to form a dried film, the dried film not being completely dried but being partially dried;

applying a second liquid material including a second insulating material to form a second applied film on the dried film, the second insulating material being different than the first insulating material; and annealing the second liquid material and the first applied film at a temperature from 300 to 500 centigrade to form an interlayer insulator layer over the gate electrode, the thickness of the insulator layer being not less than 500 nm.

2. The method of manufacturing a semiconductor device according to claim 1, further comprising:

forming a pixel electrode over the interlayer insulator layer.

3. The method of manufacturing a semiconductor device according to claim 2, further comprising:

forming a contact hole on the second electrode before the forming of the pixel electrode, the contact hole penetrating the interlayer insulator layer; and forming the pixel electrode, the pixel electrode electrically contacting the second electrode via the contact hole.

4. The method of manufacturing a semiconductor device according to claim 2, further comprising:

forming a data electrode over the interlayer insulator layer.

5. The method of manufacturing a semiconductor device according to claim 4, further comprising:

forming a contact hole on the first electrode before the forming of the pixel electrode, the contact hole penetrating the interlayer insulator layer; and forming the data electrode, the pixel electrode contacting the first electrode via the contact hole.

6. The method of manufacturing a semiconductor device according to claim 1, at least one of the first liquid material and the second liquid material being applied by liquid source misted chemical deposition method.

7. The method of manufacturing a semiconductor device according to claim 1, one of the first and second insulating materials being a polysilazane.

8. A method of manufacturing a semiconductor device having a thin film transistor, comprising:
   forming a thin film transistor on a substrate, the thin film transistor having a semiconductor layer, a first electrode, a second electrode, a gate electrode, and a gate insulator layer, the semiconductor layer being located between the first electrode and second electrode, the gate electrode overlapping the semiconductor layer, and the gate insulator layer located between the semiconductor layer and the gate electrode;
   applying a first liquid material including a first insulating material to form a first applied film over the gate electrode by a first spin coating method;
   drying the first applied film at a temperature from 80 to 150 centigrade to form a dried film;
   applying a second liquid material including a second insulating material to form a second applied film on the dried film by a second spin coating method, a rotational speed of the first spin coating method and a rotational speed of the second spin coating method being the same, a thickness of the first applied film and the second applied film being the same, the second insulating material being different than the first insulating material; and
   annealing the second liquid material and the first applied film at a temperature from 300 to 500 centigrade to form an interlayer insulator layer over the gate electrode, the thickness of the insulator layer being not less than 500 nm.

9. A method of manufacturing a semiconductor device having a thin film transistor, comprising:
   forming a thin film transistor on a substrate, the thin film transistor having a semiconductor layer, a first electrode, a second electrode, a gate electrode, and a gate insulator layer, the semiconductor layer being located between the first and second electrodes, the gate electrode overlapping the semiconductor layer, and the gate insulator layer located between the semiconductor layer and the gate electrode;
   applying a first liquid material over the gate electrode to form a first insulator layer, the first liquid material including a polyimide;
   drying the first insulator layer at a temperature from 80 to 150 centigrade to form a dried film, the dried film not being completely dried but being partially dried;
   applying a second liquid material on the first insulator layer to form a second insulator layer, the second liquid material including a polysilazane; and
   annealing the second liquid material and the first insulator layer at a temperature from 300 to 500 centigrade to form an interlayer insulator layer over the gate electrode.

10. The method of manufacturing a semiconductor device according to claim 9, further comprising:
    forming a pixel electrode over the second insulator layer.

11. The method of manufacturing a semiconductor device according to claim 10, further comprising:
    forming a contact hole on the second electrode before the forming of the pixel electrode, the contact hole penetrating the first and second insulator layers; and
    forming the pixel electrode, the pixel electrode electrically contacting the second electrode via the contact hole.

12. The method of manufacturing a semiconductor device according to claim 10, further comprising:
    forming a data electrode over the second insulator layer.

13. The method of manufacturing a semiconductor device according to claim 12, further comprising:
    forming a contact hole on the first electrode before the forming of the pixel electrode, the contact hole penetrating the first and second insulator layers; and
    forming the data electrode, the pixel electrode electrically contacting the first electrode via the contact hole.

14. The method of manufacturing a semiconductor device according to claim 9, at least one of the first liquid material and the second liquid material being applied by liquid source misted chemical deposition method.

* * * * *